(12) United States Patent
Cownie et al.

(10) Patent No.: US 8,245,244 B2
(45) Date of Patent: Aug. 14, 2012

(54) DEVICE, SYSTEM, AND METHOD OF EXECUTING A CALL TO A ROUTINE WITHIN A TRANSACTION

(75) Inventors: James H. Cownie, Bristol (GB); Ravi Narayanaswamy, San Jose, CA (US); Jeffrey V. Olivier, Champaign, IL (US); Serguei V. Preis, Novosibirsk (RU); Xinmin Tian, Union City, CA (US); Ali-Reza Adl-Tabatabai, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 1023 days.

(21) Appl. No.: 12/198,159

(22) Filed: Aug. 26, 2008

(65) Prior Publication Data

US 2010/0058362 A1 Mar. 4, 2010

(51) Int. Cl.
*G06F 3/00* (2006.01)
*G06F 7/04* (2006.01)
*G06F 13/00* (2006.01)

(52) U.S. Cl. ............................. 719/328; 726/4; 711/170

(58) Field of Classification Search ........................ None
See application file for complete search history.

(56) References Cited

U.S. PATENT DOCUMENTS

| 2002/0041517 A1* | 4/2002 | Kim et al. ................ 365/185.11 |
| 2003/0088807 A1* | 5/2003 | Mathiske et al. .................. 714/6 |
| 2006/0101522 A1* | 5/2006 | Rothwell et al. ................ 726/26 |
| 2007/0260608 A1* | 11/2007 | Hertzberg et al. .............. 707/10 |
| 2009/0183154 A1* | 7/2009 | Miskelly et al. .............. 718/100 |
| 2009/0300405 A1* | 12/2009 | Little ................................. 714/3 |

OTHER PUBLICATIONS

Hudson et al., "McRT-Malloc—A Scalable Transactional Memory Allocator", ISMM'06 Jun. 10-11, 2006, Ottawa, Ontario, Canada, pp. 74-83.

* cited by examiner

*Primary Examiner* — Lechi Truong
*Assistant Examiner* — Tuan Dao
(74) *Attorney, Agent, or Firm* — Shichrur & Co.

(57) ABSTRACT

Device, system, and method of executing a call to a routine within a transaction. In some embodiments an apparatus may include a memory having stored thereon compiled code corresponding to a transaction, wherein the transaction includes at least one call to a first routine of a pair of first and second mutually inverse routines, and wherein the compiled code includes a call to a first wrapped routine replacing the call to the first routine; and a runtime library including wrapper code, wherein the wrapper code, when executed in response to the call to the first wrapped routine, results in executing the call to the first routine within the transaction and undoing the call to the first routine responsive to abort of the transaction. Other embodiments are described and claimed.

14 Claims, 4 Drawing Sheets

DEVICE, SYSTEM, AND METHOD OF EXECUTING A CALL TO A ROUTINE WITHIN A TRANSACTION

BACKGROUND

Software transactional memory (STM) mechanism may be used for controlling access to shared memory in concurrent computing. A transaction may include code that executes a series of operations, e.g., read and/or write operations, to shared memory.

After completing an entire transaction, it is verified that changes to the shared memory have not been concurrently made by the execution of other transactions. The operation, in which the changes of a transaction are validated and, if validation is successful, made permanent, is called a commit.

A transaction may also abort at any time, causing all of its prior changes to be rolled back or undone. If a transaction cannot be committed due to conflicting changes, it is typically aborted and re-executed from the beginning until it succeeds.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
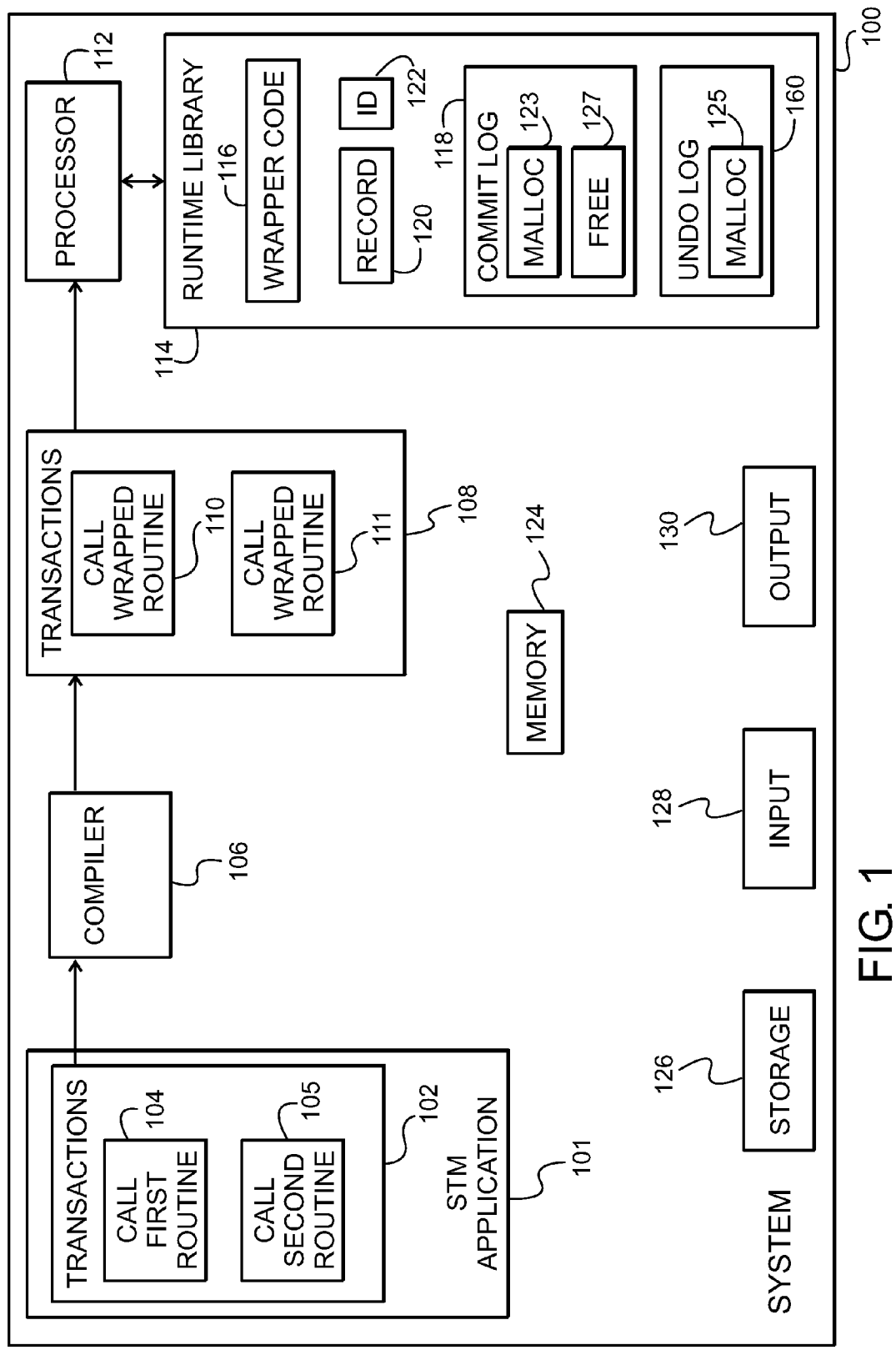
FIG. 1 is a schematic block diagram illustration of a system in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein include, for example, "multiple" or "two or more". For example, "a plurality of items" includes two or more items.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a non-mobile or non-portable device, a wireless communication station, a wireless communication device, a wireless Access Point (AP), a wired or wireless router, a wired or wireless modem, a wired or wireless network, a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

FIG. 1 schematically illustrates a block diagram of a system 100 capable of executing a Software Transactional Memory (STM) application 101, in accordance with some demonstrative embodiments.

In some embodiments, STM application 101 may include one or more transactions 102, which include code in any suitable programming language, e.g., C or C++, to be executed by a processor 112 on shared memory 124. Processor 112 includes, for example, a multi-core processor (CMP), a multiprocessor, a central processing unit (CPU), a digital signal processor (DSP), a microprocessor, a host processor, a controller, a plurality of processors or controllers, a chip, a microchip, circuitry, a logic unit, an integrated circuit (IC), an application-specific IC (ASIC), or any other suitable multipurpose or specific processor or controller. Memory 124 includes, for example, for example, a random access memory (RAM), a dynamic RAM (DRAM), a synchronous DRAM (SD-RAM), a flash memory, a volatile memory, or other suitable memory unit.

In some embodiments, system 100 may include or may be part of a computing system including a storage unit 126, an input unit 128, an output unit 130, and/or any other suitable component. Input unit 128 includes, for example, a keyboard, a keypad, a mouse, a touch-pad, a stylus, a microphone, or other suitable pointing device or input device. Output unit 130 includes, for example, a cathode ray tube (CRT) monitor or display unit, a liquid crystal display (LCD) monitor or display unit, a screen, a monitor, a speaker, or other suitable display unit or output device. Storage unit 126 includes, for example, a hard disk drive, a floppy disk drive, a compact disk (CD) drive, a CD-ROM drive, a digital versatile disk (DVD) drive, or other suitable removable or non-removable storage units.

In some embodiments, transactions 102 may include at least one call to a first routine 104 and/or a second routine 105 of a pair of mutually inverse routines. The pair of mutually inverse routines may include any pair of routines, which are inverses of each other, such that the operation performed by one of the routines reverses and/or undoes substantially all operations, results, and/or effects caused by the other routine. In one embodiment, the pair of mutually inverse routines may include a memory-allocate ("malloc") routine and a memory de-allocation ("free") routine, e.g., since the free routine undoes all effects caused by the malloc routine. For example, the calls to routines 104 and 105 may include calls to the malloc and free routines, respectively. In other embodiments, the mutually inverse routines may include any other suitable pair of routines, for example, a locking routine and an unlocking routine; a file-open routine and a file-close routine, and the like.

Some embodiments are described herein with reference to the malloc and free routines. However, other embodiments may be implemented with respect to any other suitable pair of mutually inverse routines, for example, the locking and unlocking routines, or the file-open and file-close routines.

In some embodiments, system 100 may be capable of executing transactions 102 of STM application 101 in parallel, for example, such that a transaction including one or more calls to mutually inverse routines 104 and/or 105 may be executed in parallel to one or more other transactions of application 101, e.g., as described in detail below.

In some embodiments, system 100 may include a compiler 106 to compile transactions 102 into compiled code including compiled transactions 108. The compiled code may be stored, for example, by memory 124 and/or storage. During compilation of transactions 102, compiler 106 may wrap the call to the first routine 104 and/or the second routine 105 by replacing the call to routines 104 and/or 105 with a call to a first wrapped routine 110 and/or a call to a second wrapped routine 111, respectively, e.g., as described in detail below. Compiler 106 may include, for example, a C++ STM compiler. Compiler 106 may result, for example, from executing instructions stored by memory 124 and/or storage 126.

In some embodiments, STM application 101 may include a compiler attribute to declare a transactional wrapper function to wrap the calls to mutually inverse routines 104 and/or 105, for example, using a suitable annotation, e.g., tm_wrap. The tm_wrap attribute may indicate the routine to be wrapped by the declared function. For example, an annotation tm_wrap (malloc) may be used to declare wrapping of a call to the malloc routine, and an annotation tm_wrap(free) may be used to declare wrapping of a call to the free routine. In one example, the declaration may be performed using the _declspec keyword on Windows, e.g., as follows:

```
__declspec(tm_wrap(malloc)) void * malloc_wrapper(size_t size);
__declspec(tm_wrap(free)) void free_wrapper(void * ptr);
```

The declaration may be performed using any other suitable keyword, e.g., the _attribute___keyword, on any other suitable operating system, e.g. Linux.

After the wrapper function is declared, compiler 106 may wrap in-transaction calls to routines 104 and/or 105 by replacing the calls to routines 104 and/or 105 with the calls to wrapped routines 110 and/or 111, respectively. The calls to wrapped routines 110 and/or 111 may have names, which are a mangled version of the names of routines 104 and/or 105, respectively, in order, for example, to avoid a possibility of the wrapped routines being called directly by a user. For example, the calls to the malloc and free routines may be wrapped by the calls malloc_wrapper, andfree_wrapper, respectively.

In some embodiments, compiler 106 may also support indirect calls to the wrapped routines. For example, the call to the first routine 104 may include an indirect call to the first routine via a routine pointer assigned to the first routine. Compiler 106 may wrap the indirect call by replacing the indirect call with a call to the first wrapped routine 110.

In one embodiment, compiler 106 may automatically detect function pointer assignments of a routine to be wrapped ("wrapper code"), denoted foo, e.g., the malloc routine or free routine, in application 101, e.g., as follows:

```
__declspec(tm_wrap(foo)) int __foo_wrap( )
int (*f)( ) = &foo;
........
__tm_atomic {
    (*f)( );           // dispatch wrapping "foo@Txn"
}
(*f)( ); // does runtime signature check, to dispatch wrapped "foo"
via foo@Txn.
```

When compiler 106 generates an indirect call inside a transaction, compiler 106 may generate suitable code at the call site to validate whether or not a function pointer is pointing to a wrapped function. For example, compiler 106 may generate a predefined unique value associated with an entry-point of the wrapped function, and runtime dispatch code may be capable of detecting the unique value. If the generated code at the call site recognizes the wrapped function, then the code may adjust the address, which is called, such that it arrives directly in the wrapper code. Accordingly, the wrapper routine may be called only within a transaction. Therefore, the wrapper code may not be required to make a call to the runtime to determine whether or not the wrapper code was called inside a transaction.

In some embodiments, system 100 may also include a runtime library 114 including wrapper code 116, which may be executed by processor 112, for example, upon executing the calls to wrapped routines 110 and/or 111. Wrapper code 116, when executed by processor 112, results in executing the at least one in-transaction call to routines 104 and/or 105 within a transaction and, if the transaction aborts, undoing the at least one call to routines 104 and/or 105, e.g., as described below. Wrapper code 16 and/or runtime library 114 may be stored, for example, by memory 124 and/or storage 126.

In some embodiments, wrapper code 116 may allow executing the malloc and free routines, while avoiding premature memory de-allocation. In a first example, a transaction of transactions 102 may include the following code:

```
ptr = malloc(size);
__tm_atomic {
    //arbitrary code
    free(ptr);
    //arbitrary code
}
```

According to this example, the free routine to free memory at pointer ptr may not be executed before the transaction commits since if, for example, the free routine is executed before the transaction commits, then the pointer ptr will no longer be valid when retrying execution of the transaction.

In some embodiments, wrapper code 116 may allow executing the malloc and free routines, while avoiding memory exhaustion and/or the generation of dangling references. In a second example, a transaction of transactions 102 may include the following code:

```
ptr1 = malloc(size);
// arbitrary code
```

According to this example, it a memory block (memory record) is allocated by the malloc routine and the transaction does not commit, then it may be required to ensure that the memory block is freed before retrying execution of the transaction in order, for example, to avoid memory exhaustion.

In a third example, a transaction of transactions 102 includes the following code:

```
for (i=0; i<BIG_NUMBER; i++)
{
ptr1 = malloc(size);
// arbitrary code
free(ptr1);
}
```

According to this example, delaying execution of the free routine, e.g., until the transaction commits, may result in memory exhaustion.

In some embodiments, the at least one call to routine 104 includes at least one call, within a transaction ("the current transaction") of transactions 102, to the malloc routine; and the at least one call to wrapped routine 110 includes at least one call to the wrapped malloc routine. Wrapper code 116, when executed by processor 112, may result in wrapped routine 110 including executing the malloc routine within the current transaction and, if the transaction aborts, undoing the in-transaction call to the malloc routine.

In some embodiments, wrapper code 116, when executed by processor 112, may result in wrapped routine 110 including executing the malloc routine to allocate a memory block specified by the malloc routine; maintaining, e.g., in a thread-local table, an allocation record identifying the allocated memory block; maintaining an identifier of the transaction including the malloc routine; and registering commit and undo (abort) actions corresponding to the allocated memory block to be executed on commit or abort of an outermost transaction, respectively, e.g., as described below. The commit action may include removing the allocation record; and the undo action may include removing the allocation record, and de-allocating the allocated memory block, e.g., if the memory block has not already been de-allocated, as described in detail below.

In some embodiments, wrapper code 116 results in executing the malloc routine to allocate a requested memory block; and maintaining, e.g., in a thread-local table, an allocation record 120 including information, e.g., a memory address, identifying the memory block allocated by the malloc routine.

In some embodiments, wrapper code 116 also results in maintaining, e.g., in association with record 120, a transaction identifier (ID) 122 of an outermost transaction including the call to the malloc routine, e.g., as described below.

In one embodiment, non-transactional code may be assigned with a first ID value, e.g., one. An outermost transaction may be assigned with a second ID value, e.g., two, greater than the first ID value; and a counter may be set to a third value, e.g., three, greater than the second ID value. A transaction encountered before the outermost transaction is committed, may be assigned with a transaction ID equal to the value of the counter; and the counter may be incremented, e.g., by one.

In some embodiments, wrapper code 116 may also result in registering in a commit log 118 a malloc commit action 123 corresponding to the allocated memory block; and registering in an undo log 160 a malloc undo action 125 corresponding to the allocated memory block.

Logs 118 and/or 160 may be implemented as stacks, such that logs 118 and/or 160 are accessed according to a last in first out order.

In some embodiments, wrapper code 116 may also result in wrapped routine 110 including deleting record 120, e.g., if the current transaction commits.

In some embodiments, wrapper code 116 results in wrapped routine 110 including undoing the call to the malloc routine, if the transaction is undone or aborted. For example, if the transaction is aborted, malloc undo action 125 may be executed to undo the call to the malloc routine, by executing the free routine to de-allocate the memory block identified by record 120.

In some embodiments, the at least one call to routine 105 includes at least one call within the current transaction to the free routine, to de-allocate a memory block which was allocated by the malloc routine in a previous transaction; and the at least one call to wrapped routine 111 includes a call to the wrapped free routine.

In some embodiments, wrapper code 116, when executed by processor 112, may result in wrapped routine 111 including executing the call to the free routine, e.g., only if the current transaction is not an ancestor of the previous transaction.

In closed nested transactions, if a nested transaction commits, its state is inherited by a parent transaction. If the parent transaction subsequently retries, the state of the nested transaction will also be undone. Accordingly, a committed nested transaction may be considered to be the same transaction as the parent of the nested transaction. Therefore, a transaction having an ID m ("the transaction m") may be a child of a transaction having an ID n ("the transaction n"), if n>m. It may be safe to de-allocate or free in the transaction n, a memory block allocated in the transaction m, for example, if and only if the transaction m is not an ancestor of the transaction n, e.g., if and only if:

$$n \leq m \qquad (1)$$

In some embodiments, wrapper code 116 may result in the wrapped routine 111 including scheduling commits of calls to the free routine immediately when Condition 1 is met, e.g., either within the current transaction or upon a commit of a transaction meeting Condition 1. For example, wrapped routine 111 may include determining whether or not to execute the call to the free routine by comparing an ID value of the current transaction ("the current ID value") to ID 122 associated with record 120 identifying the memory block to be de-allocated ("the malloc ID value").

In some embodiments, wrapper code 116 results in the wrapped routine 111 including executing the free routine, e.g., immediately, if, for example, the malloc ID value is greater than or equal to the current ID value.

In some embodiments, wrapper code 116 results in the wrapped routine 111 including deferring execution of the call to the free routine until after the previous transaction commits, e.g., if the current transaction is an ancestor of the previous transaction. For example, wrapped routine 111 may include registering for the memory block to be de-allocated a free commit action 127 to be executed on commit of an innermost transaction wherein the ID value of the resuming transaction meets Condition 1.

In addition, according to the third example described above, one or more actions, e.g., undo log actions, corresponding to a memory block may be removed if the free routine is committed and a retry is possible after the free routine is committed. For example, when in-place update and undo-logging are implemented, on a write inside a transaction a copy of the address and old value are saved, and on an abort/retry the old value is written back. As a result, if the actions are not removed from undo log 160, undo-log 160 of the transaction may contain references into the allocated memory block through which stores would occur when the transaction aborts/retries. In one embodiment, wrapped routine 111 may execute action 127 to commit the free routine by de-allocating the memory block; and, if a record 120 corresponding to the de-allocated memory block exists, deleting the record and calling a routine, e.g., the routine _ITM_dropReferences described below, to delete any "dangling" references corresponding to the de-allocated memory block.

In some embodiments, runtime library 114 may support one or more of the following functions:

```
/** Information about block allocated inside the transaction. */
typedef struct memrecord_s
{
   size_t size;           /* Size of the block */
   void *ptr;
   _ITM_txnId mallocId; /* Id of transaction */
   struct memrecord_s * next_block;
} memrecord_t;
// Cleanup the records allocated by this thread
extern void freeMemRecords( );
// Allocate a memrecord_t (or grab one from a free list)
extern memrecord_t * getMemRecord( );
// Add the record to a thread private hash table
extern void addRecordToTable(memrecord_t * record, void * key);
// Get the record from a thread private hash table
extern memrecord_t * getRecordFromTable(void * key);
// Get and remove the record from a thread private hash table
extern memrecord_t * removeRecordFromTable(void * key);
```

In some embodiments, runtime library 114 may support execution of the calls to wrapped routines 110 and/or 111, e.g., using one or more of the interface routines described below.

The following type may be implemented to define the type of commit and/or undo actions to be implemented by wrapped routines 110 and/or 111:

typedef void (*_ITM_action_t)(void * arg)

The following routine may be implemented to return a transaction ID value of a transaction being currently executed:

extern_ITM_txnId_ITM_getTransactionId();

The following routine may be implemented to register a commit action, e.g., action 123 or 127, and schedule execution of the commit action according to a transaction ID, denoted resumingTxnId, of a resuming transaction:

```
extern void _ITM_addUserCommitAction (const _ITM_action_t
   commit, _ITM_txnId resumingTxnId, void * arg);
```

The commit action, the ID resumingTxnId, and an input argument, denoted, arg, e.g., the address of an allocated memory block, may be saved by runtime library 114 in commit action log 118, e.g., as described above. Wrapper code 116 may assure that commit actions may be executed only once, e.g., when the ID resumingTxnId meets Condition 1. Once executed, the transaction ID may be reset to the value zero, thus avoiding re-execution of the commit action upon committing a parent of the transaction.

The following routine may be implemented to register an undo action, e.g., action 125, by saving the undo action and the input argument arg, e.g., the address of the allocated memory block, in undo log 160:

extern void_ITM_addUserUndoAction (const_ITM_action_t undo, void * arg);

The following routine may be implemented to remove runtime references stored in a memory block defined by the arguments start and size:

extern void_ITM_dropReferences (void * start, size_t size);

In some embodiments, wrapper code 116 may include one or more of the following routines, e.g., to be executed in response to the call to wrapped routines 110 and/or 111:

```
static void _ITM_CALL_CONVENTION undoMalloc(void *heapBlock)
{
   memrecord_t *descr = removeRecordFromTable(heapBlock);
   if (descr)
   {
      free(heapBlock);
   }
}
static void _ITM_CALL_CONVENTION
commitMalloc(void *heapBlock)
{
   removeRecordFromTable(heapBlock);
}
static void commitFree(void *heapBlock)
{
   memrecord_t *descr = removeRecordFromTable(heapBlock);
   if (descr)
   {
      _ITM_dropReferences(heapBlock, descr->size);
      free(heapBlock);
   }
   else
   {
      free(heapBlock);
   }
}
static void remember(void *addr, size_t size)
{ //Called to create an record of the transactional malloc
   memrecord_t *descriptor = getMemRecord( );
   // Remember the id of the allocating transaction
   descriptor->mallocId = _ITM_getTransactionId( );
   descriptor->ptr = addr;
   descriptor->size = size;
   addRecordToTable(descriptor, addr);
   _ITM_addUserUndoAction(undoMalloc, addr);
   // Delete record when committing the outermost transaction
   _ITM_addUserCommitAction(commitMalloc,
      _ITM_noTransactionId, addr);
}
```

The routine remember(void *addr, size_t size) may be performed, for example, upon executing the malloc routine. The routine may include, for example, determining the transaction ID of the transaction including the malloc routine; adding the record 120 and the ID 122 corresponding to the memory block allocated by the malloc routine; and registering the commit and undo actions corresponding to the malloc routine in logs 118 and 160, respectively.

The routine undoMalloc(void *heapBlock) may be performed, for example, upon undoing or aborting execution of the malloc routine. The routine may include executing the free routine in order to de-allocate memory blocks, which were previously allocated by one or more malloc routines, e.g., according to one or more records 120.

The routine commitMalloc(void *heapBlock) may be performed, for example, upon committing the malloc routine. The routine may include removing record 120 and ID 122 corresponding to the memory block allocated by the malloc routine.

The routine commitFree(void *heapBlock) may be performed, for example, upon committing the free routine. The routine may include removing the runtime references, e.g., one or more records 120 and IDs 122, stored in a memory block defined by the arguments start and size; and removing references in undo log 160, e.g., by the call to the routine_ITM_dropReferences.

In some embodiments, wrapper code 116 may allow executing all transactional free routines, e.g., as soon as it is safe to do so and no sooner, for example, by scheduling commits of calls to the free routine immediately upon meeting Condition 1, e.g., as described above.

In some embodiments, wrapper code 116 may allow registering an undo action to de-allocate memory blocks for all transactional calls to the malloc routine, e.g., in the event of an abort and/or retry. For example, the routine _ITM addUserUndoAction may be called when the malloc routine is executed, in order to register a free routine to free the memory block allocated by the malloc routine; and the free routine may be executed upon aborting the malloc routine, e.g., as described above.

In some embodiments, wrapper code 116 may allow deleting all references to a transactional memory block made by runtime library 114, for example, when a free routine is committed and a retry is possible after the free routine is committed. For example, the routine _ITM_dropReferences may be called immediately before or after committing the free routine, and before continuing transactional execution.

Figure 2:
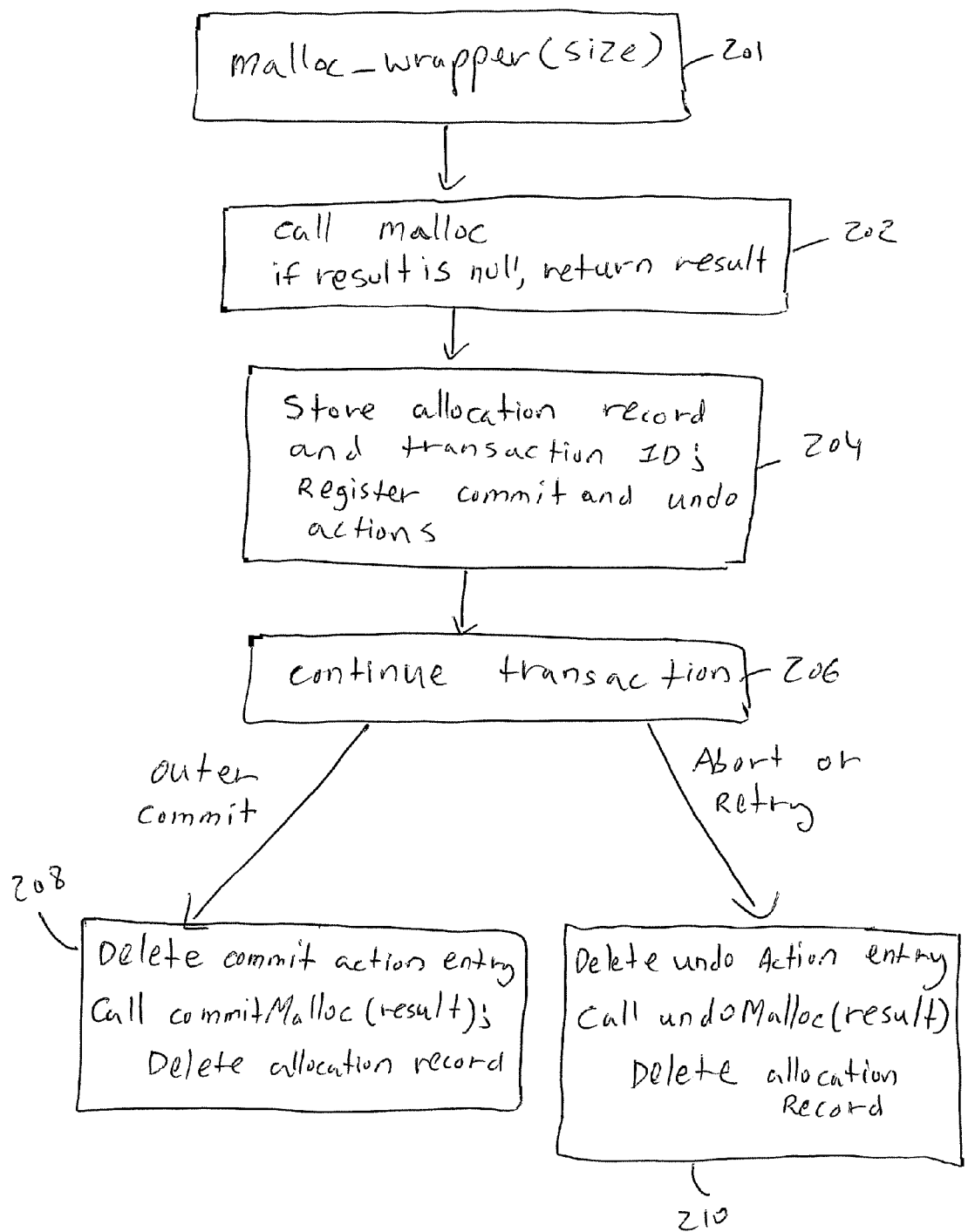
FIG. 2 is a schematic illustration of a method of handling a wrapped memory allocation routine, in accordance with some demonstrative embodiments.

Reference is now made to FIG. 2, which schematically illustrates a method of handling a wrapped malloc routine, in accordance with some demonstrative embodiments. In some non-limiting embodiments, one or more operations of the method of FIG. 2 may be performed by one or more elements of system 100 (FIG. 1), for example, processor 112 (FIG. 1) executing calls to wrapped routine 110 (FIG. 1) within a transaction of transactions 102 (FIG. 1), according to wrapper code 116 (FIG. 1).

As indicated at block 201, the method may include receiving the call to the wrapped malloc routine.

As indicated at block 202, the method may include calling the malloc routine to allocate the memory block.

As indicated at block 204, the method may also include storing an allocation record identifying the allocated memory block and an ID of the transaction; and registering a commit action and an undo action, e.g., in logs 118 (FIG. 1) and 160 (FIG. 1), corresponding to the allocated memory block. For example, the method may include calling the routine remember, as described above.

As indicated at block 206, the method may include continuing execution of the transaction, e.g., until the transaction is committed or aborted.

As indicated at block 208, the method may include deleting, e.g., from log 118 (FIG. 1), the entry of the malloc commit action, e.g., action 123 (FIG. 1), corresponding to the allocated memory block; executing the commit action, e.g., by calling the routine commitMalloc; and deleting the allocation record, e.g., record 120 (FIG. 1), corresponding to the allocated memory block.

As indicated at block 210, the method may include deleting, e.g., from 160 118 (FIG. 1), the entry of the malloc undo action, e.g., action 125 (FIG. 1), corresponding to the allocated memory block; executing the undo action, e.g., by calling the routine undoMalloc; and deleting the allocation record, e.g., record 120 (FIG. 1), corresponding to the allocated memory block.

Figure 3:
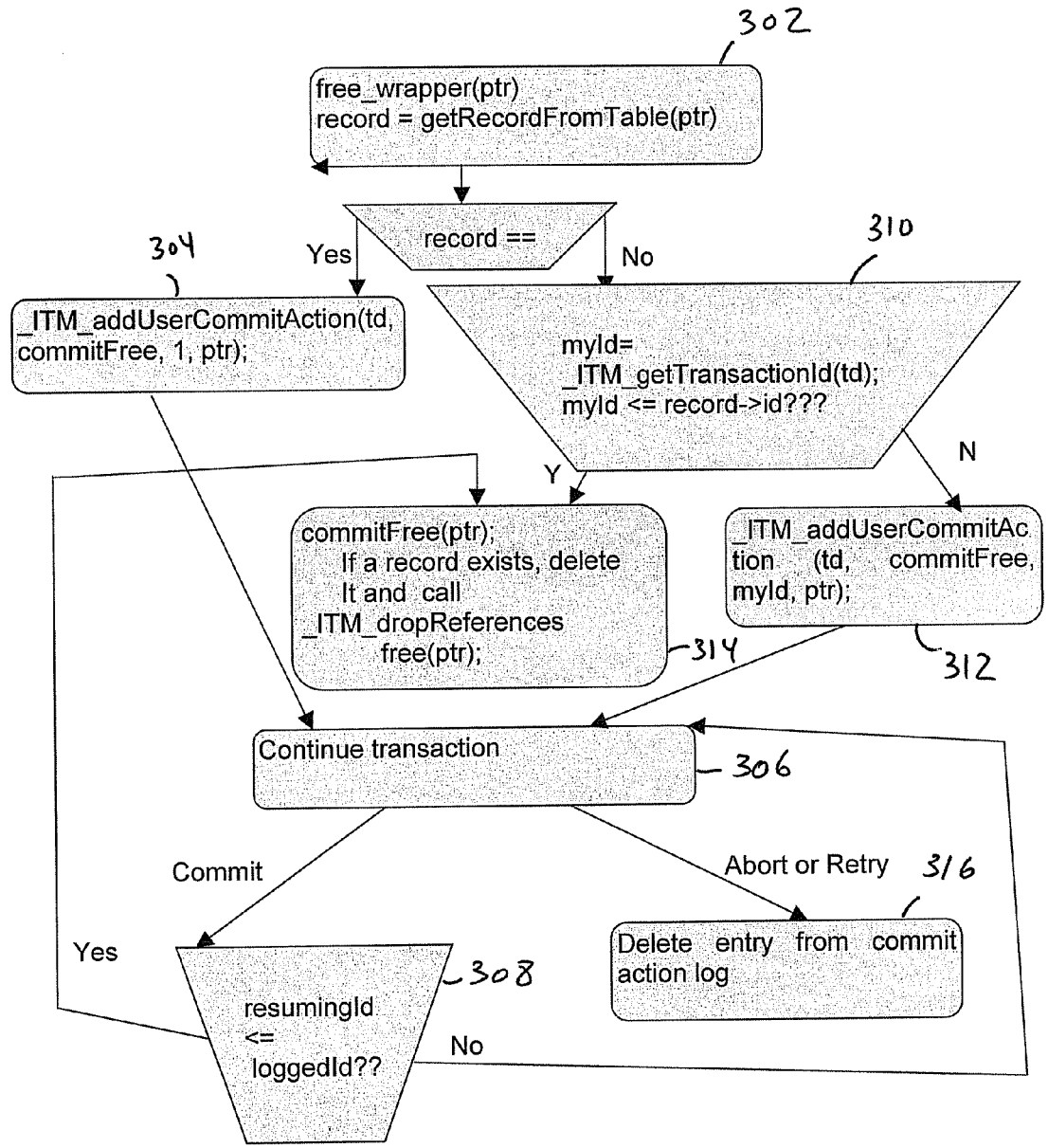
FIG. 3 is a schematic illustration of a method of handling a wrapped memory de-allocation routine, in accordance with some demonstrative embodiments.

Reference is now made to FIG. 3, which schematically illustrates a method of handling a wrapped free routine, in accordance with some demonstrative embodiments. In some non-limiting embodiments, one or more operations of the method of FIG. 3 may be performed by one or more elements of system 100 (FIG. 1), for example, processor 112 (FIG. 1) executing calls to wrapped routine 111 (FIG. 1) within a transaction ("the current transaction") of transactions 102 (FIG. 1), according to wrapper code 116 (FIG. 1).

As indicated at block 302, the method may include receiving the call to the wrapped free routine to de-allocate a memory block, and attempting to retrieve an allocation record, e.g., record 120 (FIG. 1), corresponding to the memory block to be de-allocated.

The memory block may have been allocated in an outer transaction, e.g., if the allocation record does not exist. The memory block may have been allocated in the current transaction, e.g., if the allocation record exists.

As indicated at block 310, if the allocation record exists the method may include determining whether or not a transaction ID value corresponding to the allocation record is greater than or equal to the transaction ID value of the current transaction.

As indicated at block 314, the method may include executing the commit free action and deleting the allocation record, e.g., if the transaction ID value corresponding to the allocation record is greater than or equal to the transaction ID value of the current transaction.

As indicated at block 312, the method may include registering a commit free action identifying the memory block to be de-allocated, and the transaction ID value of the current transaction, e.g., if the transaction ID value corresponding to the allocation record is smaller than the transaction ID value of the current transaction.

As indicated at block 304, if the allocation record does not exist the method may include registering a commit free action identifying the memory block to be de-allocated, and the transaction ID value of one.

As indicated at block 306, the method may include continuing execution of the transactions, e.g., until committing or aborting.

As indicated at block 308, the method may include determining whether or not the transaction ID value corresponding to the allocation record is greater than or equal to the transaction ID of a resuming transaction. The method may include continuing execution of the transactions, e.g., if the transaction ID value corresponding to the allocation record is smaller than the transaction ID of the resuming transaction. The method may include executing the commit free action and deleting the allocation record, e.g., if the transaction ID value corresponding to the allocation record is greater than or equal to the transaction ID of the resuming transaction.

Figure 4:
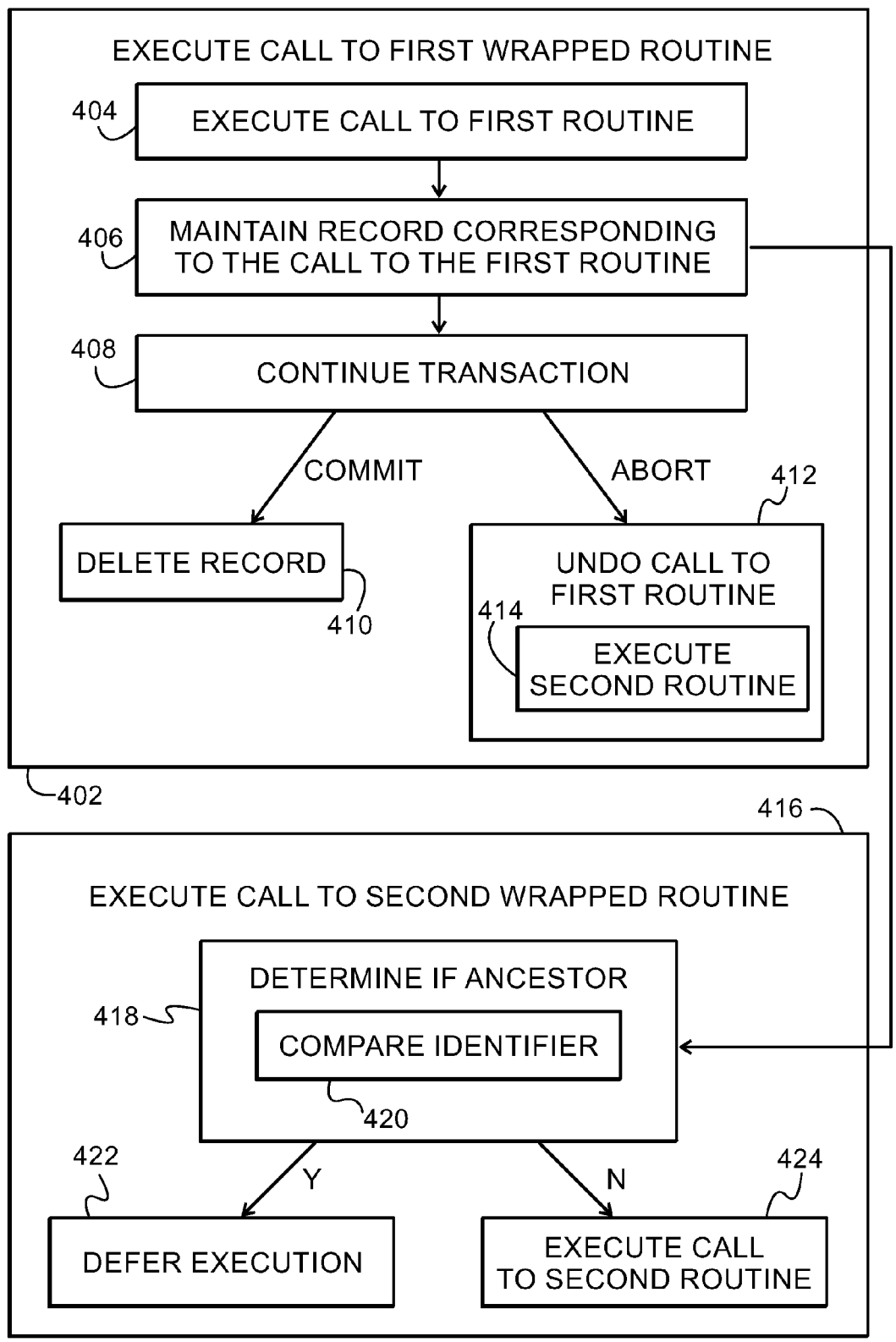
FIG. 4 is a schematic illustration of a method of handling at least one call to a wrapped routine, in accordance with some demonstrative embodiments.

Reference is now made to FIG. 4, which schematically illustrates a method of handling at least one call to a wrapped routine, in accordance with some demonstrative embodiments. In some non-limiting embodiments, one or more operations of the method of FIG. 4 may be performed by one or more elements of system 100 (FIG. 1), for example, processor 112 (FIG. 1) executing calls to wrapped routines 110 and/or 111 (FIG. 1) within transactions 102 (FIG. 1), according to wrapper code 116 (FIG. 1).

As indicated at block 402, the method may include executing a call to a first wrapped routine. The first wrapped routine may corresponding to a call within a transaction ("the current transaction") to a first routine of a pair of first and second mutually inverse routines. For example, the call to the wrapped routine may be part of compiled code, e.g., generated by compiler 106 (FIG. 1) based on transactions 102 (FIG. 1) as described above.

As indicated at block 404, executing the call to the first wrapped routine may include executing the call to the first routine within the transaction.

As indicated at block 406, executing the call to the first wrapped routine may include maintaining a record including information corresponding to the call to the first routine. For example, the method may include storing a record identifying the call to the first routine and an ID of the transaction, e.g., as described above.

As indicated at block 408, the method may include continuing execution of the transaction, e.g., until the transaction is committed or aborted.

As indicated at block 412, the method may include undoing the call to the first routine responsive to abort of the transaction.

As indicated at block 414, undoing the call to the first routine may include executing the second routine based on the maintained record, e.g., as described above.

As indicated at block 410, the method may include deleting the maintained record when the transaction commits.

As indicated at block 416, the method may also include executing a call to a second wrapped routine. The second wrapped routine may correspond to a previous call to the first routine. The previous call to the first routine may have been performed in an outer transaction or in the transaction including the call to the second routine, e.g., as described above.

In some embodiments, executing a call to the second wrapped routine may include executing the call to the second routine only if the transaction including the call to the second routine is not an ancestor of the transaction including the previous call, as described below.

As indicated at block 418, the method may include determining whether or not the transaction including the call to the second routine is an ancestor of the transaction including the previous call.

As indicated at block 420, determining whether or not the transaction including the call to the second routine is an ancestor of the transaction including the previous call may include comparing an identifier of the transaction including the call to the second routine to the identifier of the transaction including the previous call, e.g., as described above.

As indicated at block 422, the method may include deferring execution of the call to the second routine until after the transaction including the call to the first routine commits, for example, if the transaction including the call to the second routine is determined to be an ancestor of the transaction including the previous call.

As indicated at block 424, the method may include executing the call to the second routine if the transaction including the call to the second routine is determined not to be an ancestor of the transaction including the previous call.

Some embodiments, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), a rigid magnetic disk, and/or an optical disk. Some demonstrative examples of optical disks include compact disk-read only memory (CD-ROM), compact disk-read/write (CD-R/W), and DVD.

In some embodiments, a data processing system suitable for storing and/or executing program code may include at least one processor coupled directly or indirectly to memory elements, for example, through a system bus, via point-to-point interconnects, and/or in any other suitable manner. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising:
a memory having stored thereon compiled code corresponding to a transaction, wherein the transaction includes at least one call to a first routine of a pair of first and second mutually inverse routines, and wherein the compiled code includes a call to a first wrapped routine replacing the call to said first routine, and a call to a second wrapped routine corresponding to said second routine; and
a runtime library including wrapper code, wherein the wrapper code, when executed in response to the call to the first wrapped routine, results in executing said call to said first routine within said transaction, maintaining a record including an identifier of the transaction including said call to said first routine, undoing said call to said first routine responsive to abort of said transaction, and deleting said record if said transaction commits, wherein said wrapper code, when executed in response to the call to the second wrapped routine, results in determining whether or not to execute the call to said second routine by comparing an identifier of a transaction including the call to said second routine to the identifier of the transaction including the call to said first routine, and executing the call to said second routine only if the transaction including the call to said second routine is not an ancestor of the transaction including said call to said first routine.

2. The apparatus of claim 1, wherein the wrapper code, when executed in response to the call to the first wrapped routine, results in undoing the call to said first routine by executing said second routine based on said at least one record.

3. The apparatus of claim 1, wherein the wrapper code, when executed in response to the call to the second wrapped routine, results in deferring execution of the call to said second routine until after the transaction including the call to said first routine commits, if the transaction including the call to the second routine is an ancestor of the transaction including the call to said first routine.

4. The apparatus of claim 1, wherein said first routine comprises a memory-allocation routine, and wherein said first wrapped routine comprises a wrapped memory-allocation routine.

5. The apparatus of claim 4, wherein the wrapper code, when executed in response to the call to the wrapped memory-allocation routine, results in maintaining information identifying at least one memory block allocated by the at least one call to said memory-allocation routine, respectively; and executing a memory-free routine to release said at least one memory block responsive to abort of said transaction.

6. The apparatus of claim 4, wherein said second routine comprises a memory-free routine, wherein the compiled code includes a call to a wrapped memory-free routine corresponding to said second routine, and wherein the wrapper code, when executed in response to the call to the wrapped memory-free routine, results in executing said memory-free routine only if a transaction including the call to said memory free routine is not an ancestor of the transaction in which said memory block has been allocated.

7. The apparatus of claim 1, wherein the call to said first routine comprises an indirect call to said first routine via a routine pointer assigned to said first routine.

8. A method comprising:
executing a call to a first wrapped routine corresponding to a call within a transaction to a first routine of a pair of first and second mutually inverse routines; and
executing a call to a second wrapped routine corresponding to said second routine,
wherein executing the call to said first wrapped routine includes:
  executing said call to said first routine within said transaction;
  maintaining a record including an identifier of the transaction including said call to said first routine;
  undoing said call to said first routine responsive to abort of said transaction; and
  deleting said record if said transaction commits, and
wherein executing the call to said second wrapped routine includes:
  determining whether or not to execute the call to said second routine by comparing an identifier of a transaction including the call to said second routine to the identifier of the transaction including the call to said first routine; and
  executing the call to said second routine only if the transaction including the call to said second routine is not an ancestor of the transaction including said call to said first routine.

9. The method of claim 8, wherein undoing said call to said first routine comprises executing said second routine based on said at least one record.

10. The method of claim 8 comprising:
deferring execution of the call to said second routine until after the transaction including the call to said first routine commits, if the transaction including the call to the second routine is an ancestor of the transaction including the call to the first routine.

11. The method of claim 8, wherein said first routine comprises a memory-allocation routine, and wherein said first wrapped routine comprises a wrapped memory-allocation routine.

12. A computer program product comprising a computer-useable non-transitory medium including a computer-readable program, wherein the computer-readable program when executed on a computer causes the computer to:
in response to a call to a first wrapped routine corresponding to a call within a transaction to a first routine of a pair of first and second mutually inverse routines, execute said call to said first routine within said transaction, maintain a record including an identifier of the transaction including said call to said first routine, undo said call to said first routine responsive to abort of said transaction, and delete said record if said transaction commits; and
in response to a call to a second wrapped routine corresponding to said second routine, determine whether or not to execute the call to said second routine by comparing an identifier of a transaction including the call to said second routine to the identifier of the transaction including the call to said first routine; and execute the call to said second routine only if the transaction including the call to said second routine is not an ancestor of the transaction including said call to said first routine.

13. The computer program product of claim 12, wherein the computer-readable program when executed on the computer causes the computer to:
in response to the call to the second wrapped routine, defer execution of the call to said second routine until after the transaction including the call to said first routine commits, if the transaction including the call to the second routine is an ancestor of the transaction including the call to said first routine.

14. The computer program product of claim 12, wherein said first routine comprises a memory-allocation routine, and wherein said first wrapped routine comprises a wrapped memory-allocation routine.

* * * * *